United States Patent
Cummings, III et al.

(10) Patent No.: US 9,154,287 B1
(45) Date of Patent: Oct. 6, 2015

(54) ALLEVIATION OF TIME DIVISION MULTIPLEXING INTERFERENCE BETWEEN MULTIPLE ACCESS NODES

(71) Applicant: Sprint Communications Company L.P., Overland Park, KS (US)

(72) Inventors: George F. Cummings, III, Gilbert, AZ (US); Scott Francis Migaldi, Cary, IL (US); John J. Humbert, Overland Park, KS (US); Nicholas John Baustert, Jr., Shawnee, KS (US); Mark Alan Lipford, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 196 days.

(21) Appl. No.: 13/938,435

(22) Filed: Jul. 10, 2013

(51) Int. Cl.
  *H04J 3/00* (2006.01)
  *H04L 5/00* (2006.01)

(52) U.S. Cl.
  CPC .................................. *H04L 5/0073* (2013.01)

(58) Field of Classification Search
  None
  See application file for complete search history.

(56) References Cited

U.S. PATENT DOCUMENTS

| | | | |
|---|---|---|---|
| 2010/0087221 A1* | 4/2010 | Srinivasan et al. | 455/522 |
| 2011/0026415 A1 | 2/2011 | Kamuf et al. | |
| 2012/0294168 A1* | 11/2012 | Freda et al. | 370/252 |

* cited by examiner

*Primary Examiner* — Minh-Trang Nguyen

(57) ABSTRACT

Embodiments disclosed herein provide systems and methods for alleviating time division multiplexing interference between multiple access nodes. In a particular embodiment, a method provides identifying interference between a first and a second wireless access node at a wireless communication device, wherein the first and second wireless access nodes exchange wireless communications using a time division multiplexing wireless protocol on a first carrier frequency. The method further provides determining an uplink/downlink configuration for the time division multiplexing wireless protocol of the first and second wireless access nodes that does not cause the interference. The method also provides exchanging the wireless communications at the first and second wireless access nodes using the uplink/downlink configuration.

18 Claims, 8 Drawing Sheets

---

IDENTIFY TDM INTERFERENCE BETWEEN ACCESS NODE 102 AND ACCESS NODE 103
200

DETERMINE AN UPLINK/DOWNLINK CONFIGURATION THAT DOES NOT CAUSE THE TDM INTERFERENCE
202

EXCHANGE COMMUNICATIONS USING THE UPLINK/DOWNLINK CONFIGURATION
204

| Config. No. | Subframe No. | | | | | | | | | |
|---|---|---|---|---|---|---|---|---|---|---|
| | 0 | 1 | 2 | 3 | 4 | 5 | 6 | 7 | 8 | 9 |
| 0 | D | G | U | U | U | D | G | U | U | U |
| 1 | D | G | U | U | D | D | G | U | U | D |
| 2 | D | G | U | D | D | D | G | U | D | D |
| 3 | D | G | U | U | U | D | D | D | D | D |
| 4 | D | G | U | U | D | D | D | D | D | D |
| 5 | D | G | U | D | D | D | D | D | D | D |
| 6 | D | G | U | U | U | D | G | U | U | D |

FIGURE 5

| eNodeB | Config. No. | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 303 | 0 | D | G | U | U | U | D | G | U | U | U |
| 304 | 2 | D | G | U | D | D | D | G | U | D | D |
| 303/304 | 1 | D | G | U | U | D | D | G | U | D | D |

| eNodeB | Config. No. | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 303 | 0 | D | G | U | U | U | D | G | U | U | U |
| 304 | 2 | D | G | U | D | D | D | G | U | D | D |
| 303/304 | MOD | D | G | U | N | N | D | G | U | N | N |

ALLEVIATION OF TIME DIVISION MULTIPLEXING INTERFERENCE BETWEEN MULTIPLE ACCESS NODES

TECHNICAL BACKGROUND

Time division multiplexing (TDM) wireless protocols, such as Time-Division Duplex Long Term Evolution (TDD-LTE), designate timeslots for uplink and downlink communications. During an uplink timeslot, wireless devices are able to transfer communications to an access node. During a downlink timeslot, wireless devices are able to receive communications from an access node. These timeslot oriented properties of TDM communications allow both uplink and downlink communications to be transferred on a single carrier frequency.

When access nodes are located within proximity such that the wireless signals from the access nodes or their respective connected wireless devices overlap, the configuration of timeslots (i.e. uplink or downlink) should be coordinated to avoid interference between uplink communications to one access node and downlink communications from another. For access nodes in locations where a network administrator is aware of possible interference issues, the network administrator can coordinate the timeslot configuration between those access nodes to avoid interference. However, if the locations of access nodes are not anticipated to cause interference, their respective configurations may not coordinate and, therefore, cause interference.

Overview

Embodiments disclosed herein provide systems and methods for alleviating time division multiplexing interference between multiple access nodes. In a particular embodiment, a method provides identifying interference between a first and a second wireless access node at a wireless communication device, wherein the first and second wireless access nodes exchange wireless communications using a time division multiplexing wireless protocol on a first carrier frequency. The method further provides determining an uplink/downlink configuration for the time division multiplexing wireless protocol of the first and second wireless access nodes that does not cause the interference. The method also provides exchanging the wireless communications at the first and second wireless access nodes using the uplink/downlink configuration.

BRIEF DESCRIPTION OF THE DRAWINGS

FIG. 5 illustrates configurations for alleviating time division multiplexing interference between multiple access nodes.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
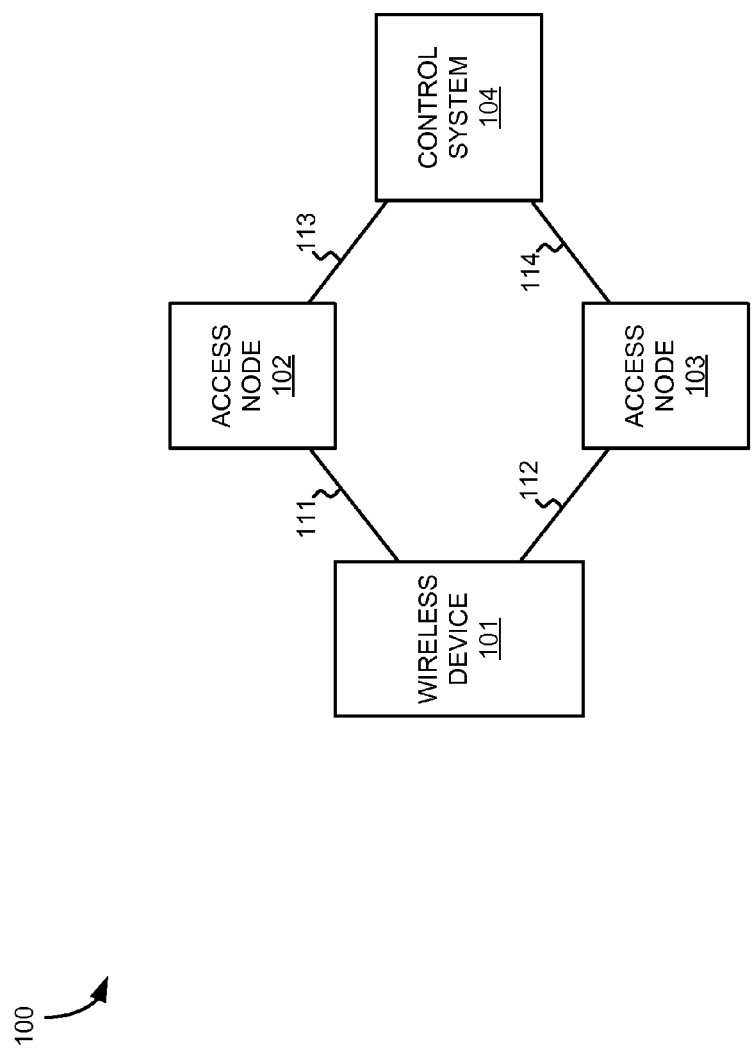
FIG. 1 illustrates a wireless communication system for alleviating time division multiplexing interference between multiple access nodes.

FIG. 1 illustrates wireless communication system 100. Wireless communication system 100 includes wireless communication device 101, wireless access node 102, wireless access node 103, and communication control system 104. Wireless communication device 101 and wireless access node 102 communicate over wireless link 111. Wireless communication device 101 and wireless access node 103 communicate over wireless link 112. Wireless access node 102 and communication control system 104 communicate over communication link 113. Wireless access node 103 and communication control system 104 communicate over communication link 114.

In operation, access nodes 102 and 103 provide communication network access to wireless communication devices, such as wireless device 101. Specifically, access nodes 102 and 103 provide wireless communication services using a time division multiplexing (TDM) wireless protocol. A TDM protocol divides wireless communications into discrete time segments within a larger time segment. In some TDM protocols these discrete time segments are referred to as sub-frames within a communication frame. Each sub-frame may be uplink or downlink and be arranged in various possible configurations within a frame. During the time allotted for an uplink sub-frame, communications are allowed to be transferred from wireless devices to an access node and, during the time allotted for a downlink sub-frame, communications are allowed to be transferred to the wireless devices from the access node.

If access nodes 102 and 103 are operating on one or more of the same carrier frequencies and their coverage areas overlap, then the uplink/downlink sub-frame configuration of the TDM protocol on each shared frequency should be the coordinated (e.g. have the same uplink/downlink configuration) so that one access node and any connected wireless devices do not interfere with each other. Specifically, the configurations should be coordinated such that one access node is not receiving uplink communications while the other is transferring downlink configurations. The downlink communications of one access node may interfere with the uplink communications of the other and vice versa. Any additional access nodes that have overlapping coverage areas should also be similarly coordinated.

If, however, access nodes 102 and 103 are not intended to have overlapping coverage areas, then the uplink/downlink sub-frame configurations of the two access nodes may not be coordinated. Such situation may occur if access nodes 102 and 103 are located so as to provide "islands" of wireless connectivity to wireless devices. In some cases, while access nodes 102 and 103 may not be located with the such that their coverage areas overlap, the wireless signals transferred to one access node from connected wireless devices may propagate into the coverage area of the other access node and interfere with downlink communications on that access node.

Figure 2:
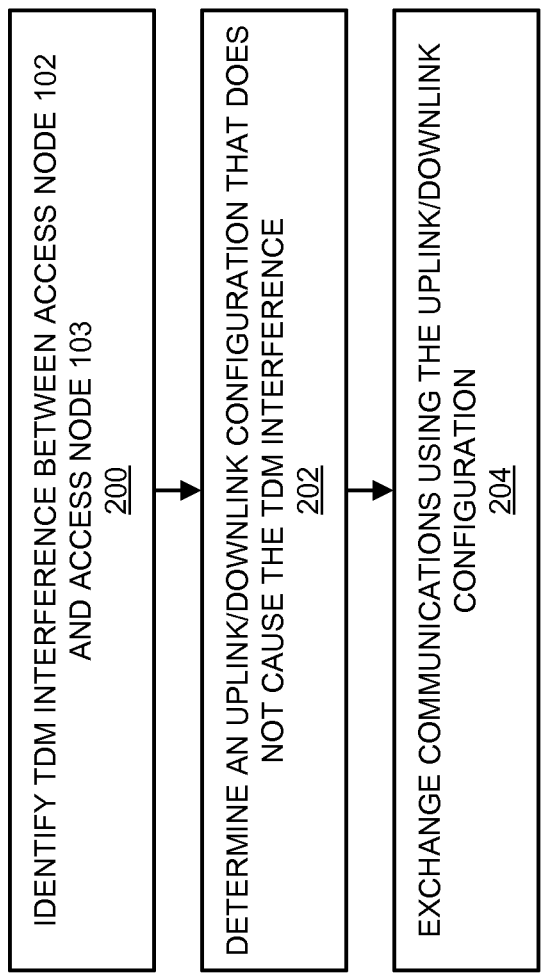
FIG. 2 illustrates an operation of the wireless communication system for alleviating time division multiplexing interference between multiple access nodes.

FIG. 2 illustrates the operation of wireless communication system 100 to alleviate time division multiplexing interference between multiple access nodes. Interference is identified between access node 102 and access node 103 at wireless device 101 (step 200). Wireless device 101 may use any method of determining wireless signal interference to identify interference at step 200. Access nodes 102 and 103 exchange wireless communications using a time division multiplexing wireless protocol on a first carrier frequency. Thus, at least a portion of the interference identified by wireless device 101 is interference caused by the uplink/downlink configuration of access nodes 102 and 103 not being the coordinated, as described above. For example, if wireless device 101 is receiving communications from access node 102, wireless device 101 may recognize interference caused by a wireless device transferring uplink communications to access node 103 at that same time.

Wireless device 101 then transfers a notification message indicating the interference to control system 104. The message may be transferred as part of typical signal quality reporting by wireless device 101 or may be transferred in a separate message.

Upon receiving the notification of the interference, control system 104 determines an uplink/downlink configuration for the time division multiplexing wireless protocol of access nodes 102 and 103 that does not cause the interference (step 202). In some embodiments, control system 104 may determine the uplink/downlink configuration by selecting single uplink/downlink configuration for both access node 102 and access node 103. The uplink/downlink configuration may be one of the uplink/downlink configurations currently being used by either access node 102 or access node 103 or may be a different uplink/downlink configuration. In other embodiments, control system 104 may modify the current uplink/downlink configuration for each of access nodes 102 and 103. For example, control system 104 may designate any sub-frames of one configuration that conflict with sub-frames of the other configuration (i.e. one sub-frame is uplink while the corresponding sub-frame is downlink) as unused sub-frames. Not using the conflicting sub-frames thereby removes any problem caused by the TDM interference.

Once the uplink/downlink configuration has been determined, the wireless communications are exchanged at access nodes 102 and 103 using the uplink/downlink configuration (step 204). Accordingly, the any interference caused by conflicting TDM configurations is alleviated because wireless devices connected to either access node will transfer uplink communications in the same sub-frames. Control system 104 may transfer a message to each access node instructing the access node as to which uplink/downlink configuration should be used. The message may include parameters for the uplink/downlink configuration or the parameters may already be stored in access nodes 102 and 103. Each access node may also transfer a similar message to connected wireless devices so that the devices are able to communicate with the access nodes using the proper configuration. This message may transferred in the same manner or a different manner than an access node typically uses to indicate a TDM configuration that should be used by a wireless device.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access nodes 102 and 103 each comprise RF communication circuitry and an antenna. The RF communication circuitry typically includes an amplifier, filter, RF modulator, and signal processing circuitry. Wireless access nodes 102 and 103 may also comprise a router, server, memory device, software, processing circuitry, cabling, power supply, network communication interface, structural support, or some other communication apparatus. Wireless access nodes 102 and 103 could each be a base station, eNodeB, Internet access node, telephony service node, wireless data access point, or some other wireless communication system—including combinations thereof.

Communication control system 104 comprises a computer system and communication interface. Communication control system 104 may also include other components such as a router, server, data storage system, and power supply. Communication control system 104 may reside in a single device or may be distributed across multiple devices. Communication control system 104 is shown externally to wireless access nodes 102 and 103, but system 104 could be integrated within the components of either or both of wireless access nodes 102 and 103. Communication control system 104 could be a mobile switching center, network gateway system, Internet access node, application server, service node, or some other communication system—including combinations thereof.

Wireless links 111-112 use the air or space as the transport media. Wireless links 111-112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 113-114 use metal, glass, air, space, or some other material as the transport media. Communication links 113-114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 113-114 could be direct links or may include intermediate networks, systems, or devices.

Figure 3:
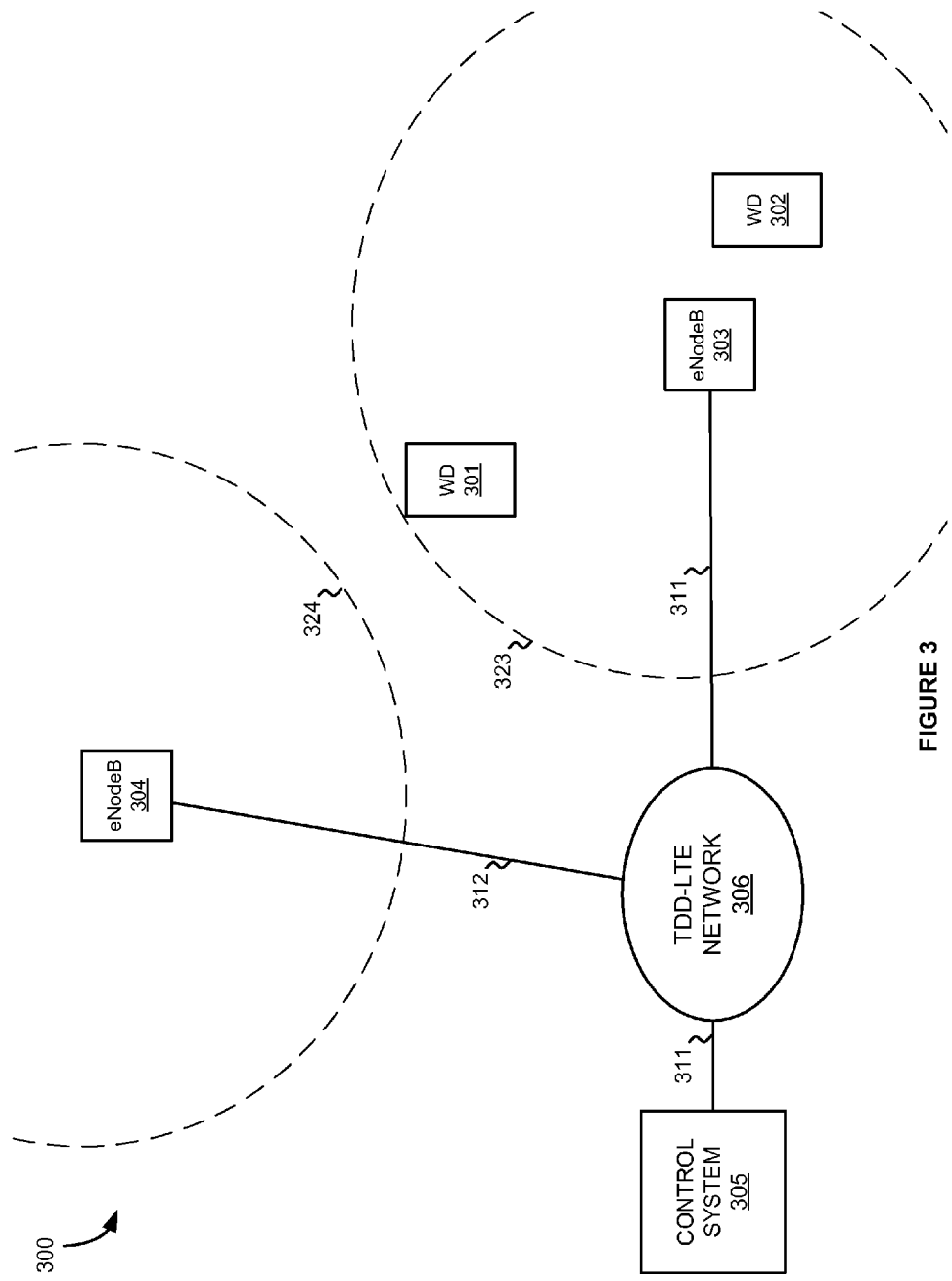
FIG. 3 illustrates a wireless communication system for alleviating time division multiplexing interference between multiple access nodes.

FIG. 3 illustrates wireless communication system 300. Wireless communication system 300 includes wireless communication device 301, wireless communication device 302, eNodeB 303, eNodeB 304, communication control system 305 and Time-Division Duplex Long Term Evolution (TDD-LTE) wireless communication network 306. eNodeBs 303-304 and TDD-LTE network 306 communicate over communication links 311-312, respectively. TDD-LTE network 306 and communication control system 305 communicate over communication link 313. Wireless communication devices 301-302 and eNodeBs 303-304 communicate over wireless links within wireless signal coverage areas 323 and 324.

In operation, TDD-LTE network 306 provides wireless communication services to wireless devices 101 and 102. eNodeBs 303-304 are two access nodes for TDD-LTE network 306 but TDD-LTE network 306 may include additional access nodes. The physical locations of eNodeBs 303-304 are intended to provide "islands" of wireless communication coverage in coverage areas 323-324. In other words, the operator of TDD-LTE network 306 did not intend coverage areas 323-324 to overlap when placing and configuring eNodeBs 303-304. Since coverage areas 323-324 do not overlap, the TDD-LTE uplink/downlink configurations for coverage areas 323-324 typically would not need to be the same while operating on the same carrier frequency. However, in this example, eNodeBs 303-304 are located close enough together that, depending on location within the coverage areas, wireless signals transferred from a wireless device in one coverage area may propagate into the other coverage area.

Figure 4:
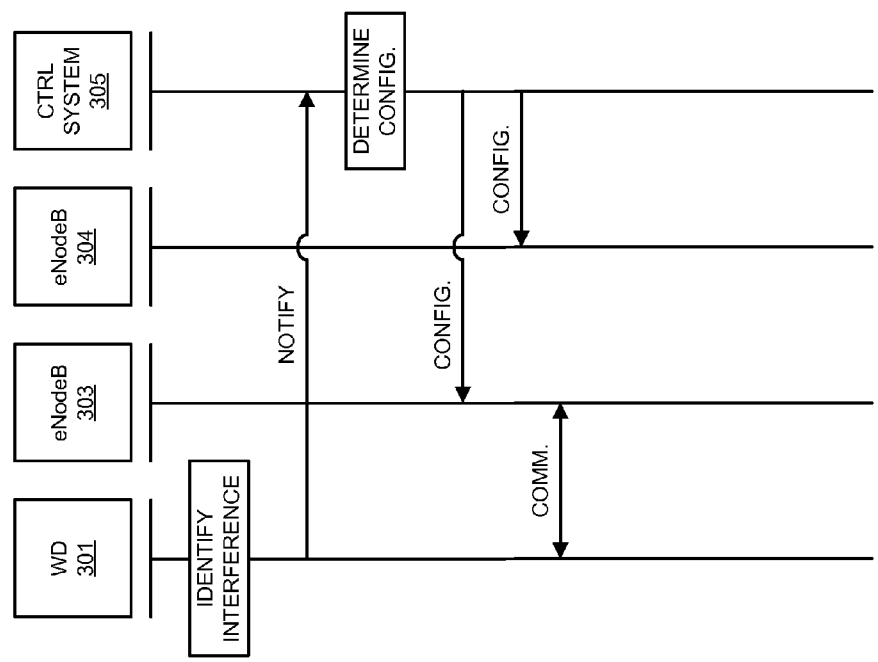
FIG. 4 illustrates an operation of the wireless communication system for alleviating time division multiplexing interference between multiple access nodes.

FIG. 4 illustrates the operation of wireless communication system 300 to alleviate time division multiplexing interference between multiple access nodes. As discussed above, eNodeBs 303-304 may be using different uplink/downlink frame configurations. Therefore, even though coverage areas 323-324 do not overlap, wireless device 101 identifies interference caused by eNodeBs 303-304 using different uplink/downlink configurations and notifies control system 305 of the identified interference. Specifically, wireless device 301 identifies that uplink communications from one or more devices within coverage area 324 are interfering with downlink communications received by wireless device 301 from eNodeB 303.

FIG. 5 illustrates configuration table 500 that includes examples of seven possible frame configurations for eNodeBs of TDD-LTE network 306. A sub-frame designated with a 'D' corresponds to a time period within the frame configuration when communications can be transferred from an eNodeB to connected wireless devices. A sub-frame designated with a 'D' corresponds to a time period within the frame configuration when downlink communications can be transferred from an eNodeB to wireless devices. A sub-frame designated with a 'U' corresponds to a time period within the frame configuration when uplink communications can be transferred from the wireless device to the eNodeB. A sub-frame designated with a 'G' corresponds to a time period within the frame configuration when no communications should be transferred to ensure no interference occurs when communications transition from downlink to uplink sub-frames.

One of the configurations listed in table 500 may be selected for use by each of eNodeBs 303-304 based on the needs of wireless devices in each respective coverage area 323-324. A frame configuration with more uplink sub-frames may be selected for an eNodeB servicing more uplink communications from wireless devices while a frame configuration with more downlink sub-frames may be selected for an eNodeB servicing more downlink communications to wireless devices.

Referring back to FIG. 4, upon receiving the notification of interference from wireless device 301, control system 305 determines the TDM uplink/downlink configurations of eNodeBs 303-304. Control system 305 may be able recognize eNodeB 303 as being the access node servicing wireless device 301 in order to determine a configuration for that node. However, control system 305 may need to determine which other eNodeBs on TDD-LTE network 306 could be causing the interference before making the configuration determination. In some embodiments, control system 305 may determine that eNodeB 304 is causing the interference based on a location of eNodeB 304 relative to the location of wireless device 301 or eNodeB 303. Alternatively, control system 305 may identify eNodeB 304 based on information received from wireless device 301. For example, eNodeB 304 may be close enough to wireless device 301 that wireless device 301 can receive identifying information in a pilot signal from eNodeB 304 that wireless device 301 sends to control system 305. Similarly, wireless device 301 may be able to identify eNodeB 304 from information in the uplink communications that caused the interference.

Figure 6:
FIG. 6 illustrates configurations for alleviating time division multiplexing interference between multiple access nodes.
Figure 7:
FIG. 7 illustrates configurations for alleviating time division multiplexing interference between multiple access nodes.

Regardless of how control system 305 determines that eNodeBs 303-304 are the applicable nodes, in this example, control system 305 determines that eNodeB 303 is using configuration number 0 and eNodeB 304 is using configuration number 2, as illustrated in tables 600 and 700 of FIGS. 6 and 7, respectively. Control system 305 may determine the two configurations by querying eNodeBs 303-304, by accessing a database of eNodeB configurations, or by any other method.

Once the configurations of eNodeBs 303-304 are determined, control system 305 determines a configuration that will alleviate the interference caused by clashing uplink and downlink sub-frames of eNodeBs 303-304.

In some embodiments, control system 305 determines one of the configurations in table 500 that can be used by both eNodeBs 303-304. The configuration may be selected based on the needs of wireless devices communicating with each eNodeB. For example, control system 305 may balance the uplink and downlink needs of each eNodeB to determine the configuration. Other factors may also be considered, such as the priority of the wireless devices communicating with each eNodeB, the number of devices, or any other factor that may effect whether an eNodeB requires more or fewer sub-frames of a give type. In a specific example, as illustrated in table 600 of FIG. 6, control system 305 determines that there should be an even compromise between the number of uplink and downlink sub-frames for each eNodeB. Accordingly, control system 305 selects configuration number 1 for use by eNodeBs 303-304 because configuration 1 provides eNodeB 303 with two less uplink sub-frames and eNodeB 304 with two less downlink sub-frames.

In other embodiments, control system 305 may modify the configurations of eNodeBs 303-304 to create a configuration that does not interfere. For example, as illustrated in table 700 of FIG. 7, for sub-frames where configuration 0 and configuration 2 are not the same type of uplink or downlink frame, control system 305 changes the sub-frame to a not-used sub-frame designated by the letter 'N' in a modified configuration. Having eNodeBs 303-304 not use the conflicting sub-frames nullifies any interference caused by the conflict.

Again referring back to FIG. 4, once control system 305 has determined the configuration that should be used by eNodeBs 303-304, control system 305 instructs eNodeBs 303-304 to use the determined configuration. Upon receiving the instruction from control system 305, eNodeB 303 uses the configuration to communicate with wireless device 301 and, since eNodeB 304 is using that same configuration, uplink communications being transferred from wireless devices to eNodeB 304 should no longer be causing interference for wireless device 301.

In embodiments where control system 305 modifies the configurations, as exemplified in table 700, eNodeB 303 may only use the modified configuration when communicating with devices that are receiving interference from devices transferring communications to eNodeB 304. For example, wireless device 302 does not report any interference caused by uplink communications with eNodeB 304 to control system 305 because wireless device 302 is located further away from eNodeB 304 and, consequently, further away from any devices communicating with eNodeB 304. Therefore, eNodeB 303 continues to exchange communications with wireless device 302 using configuration 0 while exchanging communications with wireless device 301 using the modified configuration. Similarly, eNodeB 304 may exchange communications with wireless devices causing interference with wireless device 301 using the modified configuration while continuing to exchange communications with wireless devices not causing interference (i.e. those devices further away from wireless device 301) using configuration 2.

Additionally, in the preceding example, to determine whether eNodeB 303 should use the modified configuration for communicating with a particular device (e.g. wireless device 302), eNodeB 303 (or control system 305) may consider interference information received from each particular device, distance the device is from eNodeB 303 and/or 304, a geographic area determined to have interference based on interference reported from multiple wireless devices, or any other factor that could affect whether the modified communications should be used by a device—including combinations thereof.

Figure 8:
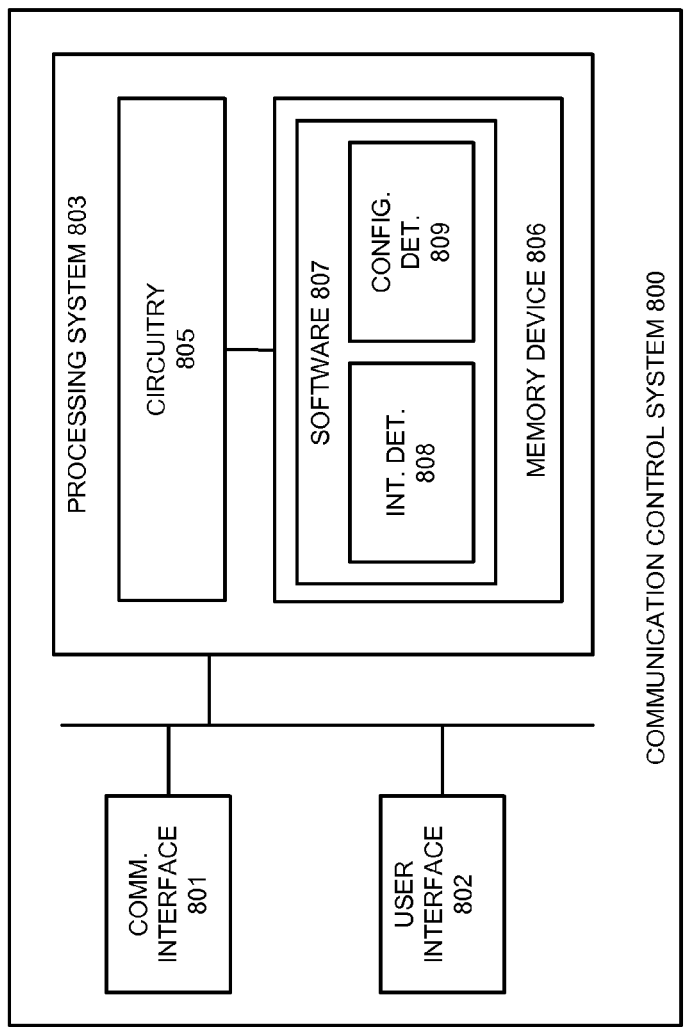
FIG. 8 illustrates a communication control system for alleviating time division multiplexing interference between multiple access nodes.

FIG. 8 illustrates communication control system 800. Communication control system 800 is an example of communication control system 104, although control system 104 may use alternative configurations. Communication control system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes interference determination module 808 and configuration determination module 809. Operating software 807 may further include an operating system, utilities, drivers, network interfaces, applications, or some other type of software. When executed by circuitry 805, operating software 807 directs processing system 803 to operate communication control system 800 as described herein.

In particular, interference determination module 808 instructs processing system 803 to identify interference between a first and a second wireless access node at a wireless communication device, wherein the first and second wireless access nodes exchange wireless communications using a time division multiplexing wireless protocol on a first carrier frequency. Configuration determination module 809 instructs processing system 803 to determine an uplink/downlink configuration for the time division multiplexing wireless protocol of the first and second wireless access nodes that does not cause the interference. Configuration determination module 809 then instructs processing system 803 to direct the first and second wireless access nodes to exchange the wireless communications using the uplink/downlink configuration.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
    a first wireless access node and a second wireless access node exchanging first wireless communications with a wireless communication device using a first time division multiplexing configuration;
    identifying interference at the wireless communication device between the first wireless access node and the second wireless access node;
    determining one or more corresponding sub-frames that interfere at the wireless communication device between the first wireless access node and the second wireless access node that that are using the first time division multiplexing configuration;
    generating a second time division multiplexing configuration that does not cause the interference at the wireless communication device between the first wireless access node and the second wireless access node by changing the one or more corresponding sub-frames into unused sub-frames wherein an unused sub-frame provides a period of time when no uplink or downlink communications are allowed for the wireless communication device; and
    the first wireless access node and the second wireless access node exchanging second wireless communications with the wireless communication device using the second time division multiplexing configuration.

2. The method of claim 1, wherein the second time division multiplexing configuration comprises a configuration of sub-frames within a radio communication frame, wherein the sub-frames comprise one or more uplink sub-frames that provide a period of time when uplink communications are allowed to transfer from the wireless communication device to the first wireless access node and the second wireless access node and one or more downlink sub-frames that provide a period of time when downlink communication are allowed to transfer from the first wireless access node and the second wireless access node to the wireless communication device.

3. The method of claim 1 further comprising the wireless communication device transferring a notification message indicating the interference to a control system.

4. The method of claim 1 wherein the second time division multiplexing configuration is used by the first wireless access node and the second wireless access node for communications exchanged with wireless communication devices that are located in a geographic area having the interference.

5. The method of claim 4, wherein the first wireless access node continues to use the first time division multiplexing configuration for communications exchanged with a first set of wireless communication devices not in the geographic area and the second wireless access node continues to use the first time division multiplexing configuration for communications exchanged with a second set of wireless devices not in the geographic area.

6. The method of claim 3, wherein transferring the notification message indicating the interference to the control system comprises transferring the notification message as part of a signal quality report by the wireless communication device.

7. The method of claim 1, wherein determining the second time division multiplexing configuration further comprises:
   identifying uplink and downlink needs of the first wireless access node and the second wireless access node; and
   selecting the second time division multiplexing configuration as a best fit time division multiplexing configuration of a plurality of time division multiplexing configurations for the needs of both the first and the second wireless access nodes.

8. The method of claim 1, wherein the time division multiplexing configuration is a Time-Division Duplex Long Term Evolution (TDD-LTE) configuration.

9. The method of claim 1, wherein the second time division multiplexing configuration is one of a plurality of preset time division multiplexing configurations.

10. A wireless communication system, comprising:
   a first wireless access node and a second wireless access node configured to exchange first wireless communications with a wireless communication device using a first time division multiplexing configuration;
   a processing system configured to identify interference at the wireless communication device between the first wireless access node and the second wireless access, determine one or more corresponding sub-frames that interfere at the wireless communication device between the first wireless access node and the second wireless access node that are using the first time division multiplexing configuration, and generate a second time division multiplexing configuration that does not cause the interference at the wireless communication device between the first wireless access node and the second wireless access node by changing the one or more corresponding sub-frames into unused sub-frames wherein an unused sub-frame provides a period of time when no uplink or downlink communications are allowed for the wireless communication device; and
   the first wireless access node and the second wireless access node configured to exchange second wireless communications with the wireless communication device using the second time division multiplexing configuration.

11. The wireless communication system of claim 10, wherein the second time division multiplexing configuration comprises a configuration of sub-frames within a radio communication frame, wherein the sub-frames comprise one or more uplink sub-frames that provide a period of time when uplink communications are allowed to transfer from the wireless communication device to the first wireless access node and the second wireless access node and one or more downlink sub-frames that provide a period of time when downlink communication are allowed to transfer from the first wireless access node and the second wireless access node to the wireless communication device.

12. The wireless communication system of claim 10 further comprising a wireless transceiver configured to transfer a notification message indicating the interference to a control system.

13. The wireless communication system of claim 10 wherein the second time division multiplexing configuration is used by the first wireless access node and the second wireless access node for communications exchanged with wireless communication devices that are located in a geographic area having the interference.

14. The wireless communication system of claim 13, wherein the first wireless access node continues to use the first time division multiplexing configuration for communications exchanged with a first set of wireless devices not in the geographic area and the second wireless access node continues to use the first time division multiplexing configuration for communications exchanged with a second set of wireless communication devices not in the geographic area.

15. The wireless communication system of claim 12, wherein the wireless transceiver is configured to transfer the notification message as part of a signal quality report by the wireless communication device.

16. The wireless communication system of claim 10, wherein to determine the second time division multiplexing configuration, the processing system is further configured to:
   identify uplink and downlink needs of the first wireless access node and the second wireless access node; and
   select the second time division multiplexing configuration as a best fit time division multiplexing configuration of a plurality of time division multiplexing configurations for the needs of both the first and the second wireless access nodes.

17. The wireless communication system of claim 10, wherein the time division multiplexing configuration is a Time-Division Duplex Long Term Evolution (TDD-LTE) configuration.

18. The wireless communication system of claim 10, wherein the second time division multiplexing configuration is one of a plurality of preset time division multiplexing configurations.

* * * * *